(12) United States Patent
Ghaffari

(10) Patent No.: US 6,662,068 B1
(45) Date of Patent: Dec. 9, 2003

(54) REAL TIME TOTAL ASSET VISIBILITY SYSTEM

(76) Inventor: Touraj Ghaffari, 3432 Pine Haven Cir., Boca Raton, FL (US) 33431

(*) Notice: Subject to any disclaimer, the term of this patent is extended or adjusted under 35 U.S.C. 154(b) by 0 days.

(21) Appl. No.: 09/976,734

(22) Filed: Oct. 12, 2001

(51) Int. Cl.$^7$ .................................................. G01S 3/02
(52) U.S. Cl. ...................... 700/115; 700/229; 700/116; 700/215; 700/225
(58) Field of Search ............................... 700/215, 225, 700/229, 115, 116

(56) References Cited

U.S. PATENT DOCUMENTS

| | | | | |
|---|---|---|---|---|
| 5,012,224 A | * | 4/1991 | Drucker | 340/551 |
| 5,550,547 A | * | 8/1996 | Chan et al. | 342/42 |
| 5,640,002 A | * | 6/1997 | Ruppert et al. | 235/383 |
| 5,920,287 A | * | 7/1999 | Belcher et al. | 342/450 |
| 5,936,527 A | * | 8/1999 | Isaacman et al. | 340/10.31 |
| 6,015,091 A | * | 1/2000 | Rockstein et al. | 235/462.46 |
| 6,128,549 A | * | 10/2000 | Swartz et al. | 342/51 |
| 6,144,848 A | * | 11/2000 | Walsh et al. | 235/379 |
| 6,150,921 A | * | 11/2000 | Werb et al. | 340/10.1 |
| 6,204,765 B1 | * | 3/2001 | Brady et al. | 340/10.1 |
| 6,324,311 B1 | * | 11/2001 | Gann | 358/478 |

OTHER PUBLICATIONS

FCC Document, FCC 01–290, Oct. 2, 2001.*

* cited by examiner

Primary Examiner—Leo Picard
Assistant Examiner—Michael D. Masinick
(74) Attorney, Agent, or Firm—Malloy & Malloy, P.A.

(57) ABSTRACT

A system and method for tracking articles and controlling inventory thereof on a real time basis comprising the use of a tag assembly including a plurality of tags including both active tags and passive tags distinguishable from one another by the provision of a self contained power source in the active tags. One or more readers are disposed within a locale being monitored and are structured to communicate received data transmission from a host controller, for additional administrative processing in terms of determining the existence, location and/or movement of various articles with which the plurality of tags are directly associated. Depending on the category of tags, they may be activated by either entering an electric field of a predetermined first frequency or by receiving an activation signal from the reader assembly also transmitted at the first predetermined frequency. Communication between the tags and the reader occurs at a second frequency being different from the first frequency.

39 Claims, 5 Drawing Sheets

REAL TIME TOTAL ASSET VISIBILITY SYSTEM

BACKGROUND OF THE INVENTION

1. Field of the Invention

This invention is directed to a system which allows effective inventory control and extensive tracking capabilities of a plurality of articles by providing total real time access to a monitored locale in order to establish the existence, location and/or direction of movement of the articles. A plurality of tags are associated with the various articles being monitored, at least some of which include multi-frequency and uni-directional or multi-directional communication capabilities which at least partially serve to extend the operative range between the tags and a reader assembly in order to efficiently perform the monitoring procedure.

2. Description of the Related Art

The monitoring of a variety of different articles, products, etc. through the use of "tags" secured to or otherwise associated with the various articles has been in use for many years. Moreover, various attempts to modify this type of tracking and inventory control have been made so as to adapt a tagging system for use in a variety of different applications. Such known applications include, but are not limited to, warehouses, retail outlets, industrial manufacturing sites, and almost any location where the variety or articles or products being monitored are manufactured, transported, stored, sold, etc.

In its more simplistic form, the tagging of articles has been associated with the display of pricing information in association with the shelving of various products, such as in retail outlets. Pricing and inventory controls are sometimes maintained through the inclusion of coded data on the tags, such as by means of bar codes, which are determinative of the identity, price, etc, of the various products. Initially, and as is currently being used, these types of "shelf tags" have been simply constructed and include various information displayed thereon. Such displayed information, when coded as set forth above, can be read by various types of optical or digital scanners.

While shelf tags of the type set forth above are generally considered to be operative for less sophisticated applications, they are commonly recognized as being inefficient and cumbersome for use in many areas of commerce associated with the storage, transport, manufacture, etc, of various types of products or articles being monitored. As one example, the updating the information frequently requires complete replacement of the tags thereby at least partially defeating the goal of efficient inventory, tracking and pricing controls for which such systems were primarily intended.

To overcome the above noted problems associated with shelf tags, attempts have been made to develop more sophisticated electronic tags which are associated with some type of display facilities. Typically known electronic tags and their attendant systems, of the type referred to herein require the use of complicated circuitry and cooperative electronic control components in order to affect their installation and use. Another major draw back associated with devices of this type is that in order to maintain an efficient and accurate display a continuous supply of power must be maintained. The maintenance of such power is limited resulting in the limiting of information which can reasonably be displayed. Accordingly frequent replacement of the tags, associated power supplies, display facilities, etc, is the result.

In an effort to expand the versatility and efficiency of tracking and inventory control of a variety of articles, products, etc. and as a result of the problems and disadvantages of the type set forth above, associated industries have moved forward. Resulting advancements in this field has yielded the development and utilization of radio frequency (RF) tags and their attendant systems. In general, RF tags are capable of retaining and transmitting a substantial amount of information, all of which is required for the expansive tracking, security and inventory control requirements associated with modern day industrial, transport and retail facilities.

More specifically, the RF tag systems are capable of receiving and storing information in a read/write application as well as being capable of sending and/or receiving data relating to product identification, status, location and overall control. However, known or conventional RF tagging systems are recognized as having at least one primary disadvantage associated with limited communication range. Accordingly, in order that transmission of signals to one or more tags be accomplished for purposes of activation and/or data communication, an appropriate exciter/reader would have to be positioned in very close proximity to the one or more tags involved in the monitoring system. Therefore, the versatility and practical applications of such systems are severely limited due at least to the proximity or range restrictions associated therewith. Efficient monitoring of articles during product delivery, transportation, material handling, security tracking and large scale storage may not be possible. As a result, radio frequency tag technology has not enjoyed wide spread use in many industrial applications associated with the commercial development of various products.

Based on the above, there are still significant disadvantages and problems associated with known tagging systems especially when considering the wide variety of industrial applications where such systems could be effectively implemented. Accordingly, there is a significant and long recognized need for an improved tracking and/or inventory control system. Such an improved system should be capable of 100% real time inventory control as well as detecting the existence, location and direction of movement of an item. A plurality of RF tags associated with such an improved system could be further structured to detect tampering, low battery power, unauthorized movement and/or removal from the articles or products being monitored.

Such an improved system could also be adapted, without significant structural or operative modification, for usage in a variety of different areas including large scale warehousing, transport, delivery, retail inventory, pricing and security, theft prevention, all without significant manual intervention. In addition, other unique and/or customized features can be associated with the tags, dependent on the customer/user applications and requirements.

Accordingly, an improved system using multi frequency tags with strategically placed readers, accomplishing activation and/or powering of certain ones of the plurality of tags utilizing a higher level of power signal and prescribed frequency range would increase the reading or transmission distance associated with the tags thereby allowing such an improved system to overcome the recognized problems and disadvantages associated with RF tagging monitoring system of the type set forth above.

SUMMARY OF THE INVENTION

This invention is directed to a real time total asset vis-ability system which in practical application is manifested in a monitoring system for maintaining inventory control, on a real time basis, of a variety of articles and within a monitored local. For purposes of clarity, the terms "monitored locale" may assume a variety of different locations such as, but not limited to a warehouse, manufacturing or storage facility, transport and/or delivery vehicles, as well as a variety of retail facilities. In addition, the versatility of the monitoring system of the present invention can be used for inventory control as well as positional and movement tracking of various articles with minimal or no structural/operational modifications of the various operative components of which the system is comprised.

More specifically, the system of the present invention comprises a host controller which may be in the form of a computer/processor disposed in communicating relation at or remote from the locale being monitored. In addition, a reader assembly comprises, dependent upon the specific embodiment and practical application for which the system of the present invention is adapted, one or more readers. As will be explained in greater detail hereinafter, the reader assembly may comprise a variety of different types of readers structured to perform a variety of procedures for individually and collectively monitoring a plurality of radio frequency (RF) responsive tags. The tags are mounted on or otherwise directly associated with various articles being monitored. It is of course understood that the articles being monitored may of course vary greatly and are not limited to a specific class or category of objects, products, etc. Also the tags may be a part of or directly associated with "personnel badges" for the location, identification, etc, of numerous authorized personnel which have access to the monitored locale and/or the plurality of articles stored within or passing into or out of the monitored locale.

It is also emphasized that the reader assembly may in certain applications comprise a plurality of readers disposed in a predetermined array throughout the locale being monitored, such as when such a plurality of readers are fixedly disposed within the locale. In other preferred embodiments of the subject monitoring system, as represented by various practical applications, the reader assembly may comprise a single reader or relatively few readers. In this latter application and by way of example only, the reader assembly may comprise one or more mobile or handheld readers which are movable about the monitored locale. The mobile/handheld readers thereby communicate with the plurality of tags for purposes of establishing the existence and/or identification of the various articles associated with the tags.

The plurality of monitoring tags may also vary in structure and function based on their intended operation and the practical application to which they are applied. In the various preferred embodiments of the present invention a common operative characteristic of at least some of the plurality of tags is the ability to establish uni-directional communication or transmission to the reader assembly. Further, each of the tags are pre-programmed to include identification or other pertinent data which enables the user or operator to determine the status of the plurality of articles. As a generally descriptive term, the status of a monitored article may comprise the determination of its existence, location, direction of travel, removal, etc. dependent on the requirements of the customer or user of the subject monitoring system.

By way of example, in its simplest form, one or more of the tags defining the tag assembly comprises a passive tag characterized by not having a self-contained power supply associated therewith. Moreover, the passive tags are powered by being exposed to and/or maintained within an electric field or exposed to an electric signal of a predetermined first frequency. Once powered and activated identification and/or pertinent data relating to inventory control and/or tracking is transmitted from the various passive tags (as well as the active tags to be described hereinafter) to an appropriate one or more readers servicing the monitored local. Once received, the data transmitted from the plurality of tags is then transmitted by the reader assembly to the host controller/processor. The data is further processed by the host controller as required to maintain the desired inventory and/or tracking controls. As will also be explained in greater detail hereinafter, communication or transmission from the tags to the reader assembly occurs at a second frequency, which differs from the aforementioned first frequency or activation and/or power-up frequency.

The tag assembly may also include one or more active tags which are distinguishable from the aforementioned passive tags by including a self-contained power source. As such, the active tags are pre-programmed to periodically transmit, on a pre-scheduled time basis, identification data or other appropriate information to one or more of the readers associated with the locale being monitored. Such active tags further include power supply detection capabilities which will communicate to the reader assembly the existence of a failing battery or a depleted power source. Both the passive and active tags are also structured to include numerous other operative features including tamper switches and locking devices particularly, but not exclusively, adapted for use in retail environments.

Further, both the passive and active tags may have common operative features such as multi-frequency capabilities wherein the activation or power-up field or signal is generated at the aforementioned first frequency and communication between the tag and the reader, either in a uni-directional or bi-directional mode, occurs at a second, differing frequency. The existence of the multi-frequency capabilities of the various tags enhances the range or proximity in which communication, activation, power-up, etc, may occur.

More specifically, FCC regulations prohibit the generation or transmission of pulsed signals, for example between a reader and a tag, except when licensing requirements are met. However FCC regulations do allow for the generation of fields/signals of certain frequencies, having pre-established band parameters, to be transmitted or generated at increased field strengths. Therefore, establishing a field strength of "unlimited radiated energy" within the frequency parameters specified is permitted. In other words, increased power can be utilized within certain in specified frequency ranges, including 13.56 MHz. to increase the range in which the tags of a monitoring system can be detected, activated, powered-up, etc. without violating FCC regulations. Accordingly, activation signals or the establishment of electric fields for the activation or "wake-up" and/or "power-up" of one or a plurality of RF responsive tags can be accomplished using increased field strengths as long as there is no human exposure hazards involved. Therefore, utilizing the aforementioned first frequency in the frequency range of 13.56 MHz. allows for the activation and/or powering (such as in passive tags) at a much higher energy level so as to increase the read distance and/or proximity range to at least approximately 12 to 15 feet without violating any regulatory codes.

The aforementioned multi-frequency capabilities of the various types of tags (both active and passive) in the monitoring system of the present invention further provides for data transmission or communication between the tags and the reader assembly at a second frequency, which differs from the aforementioned first frequency. Further such data transmission normally occurs on a periodic pulsed basis, at pre-scheduled times, rather than as a continuously generated, high strength field or signal, at which the first frequency normally occurs. Also, in certain preferred embodiments to be described hereinafter, one or more of the plurality of tags are structured for asynchronous transmissions, at the second communication frequency, to the reader or host controller.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
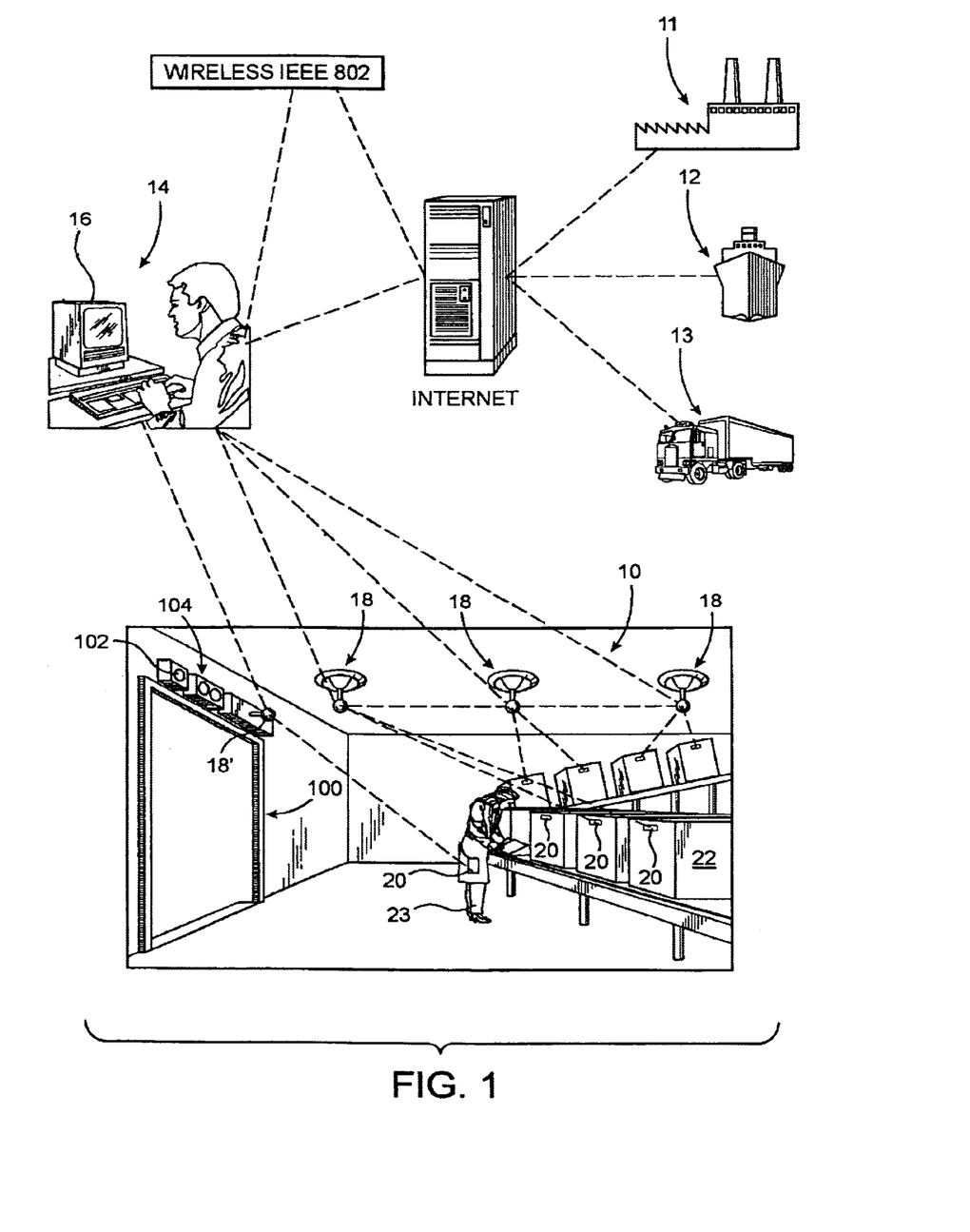
FIG. 1 is a schematic representation of a preferred embodiment of the monitoring system of the present invention as demonstrated in one of a large number of possible practical applications.

As shown in the accompanying Figures and as generally represented in FIG. 1, the present invention is directed to a real time total asset visibility system particularly, but not exclusively, adapted for maintaining effective inventory control as well as being capable of accomplishing efficient tracking of a plurality of articles, wherein the status of the various is articles can be determined on a real time basis. As used herein, the status of the various monitored articles is more specifically meant to describe the ability to determine the existence, location, identity, direction of movement, as well as the passage of the various articles to and from a monitored locale.

Accordingly, as disclosed in FIG. 1, the monitored locale is generally indicated as 10 and may include a warehouse, storage facility, transportation depot, etc. It is emphasized that the locale being monitored may also include various industrial sites 11 where the articles are manufactured or processed and any of a number of various transportation vehicles such as ships generally indicated as 12, trucks generally indicated as 13, etc. Such vehicles may be associated with the transport and temporary storage of the monitored articles.

In addition, the monitoring system of the present invention includes one or more host controllers generally indicated as 14 which is disposed in communicating relation with anyone or all of the plurality of monitored locales 10 through 13. The host controller 14 may be in the form of a somewhat conventional PC, or other processor/computer facility 16 and is utilized to accomplish higher level processing in order to filter the data received from the remainder of the operative components of the monitoring system of the present invention and thereby maintain adequate inventory control and/or perform tracking procedures, as set forth above.

As also schematically represented in FIG. 1, communication between the various monitored locales 10 through 13 and the one or more host controllers 14 may occur by a variety of different relatively standard communication facilities. Such communication facilities may include, but are not limited to, wireless transmission, Internet access, hard wire connections, etc. Accordingly, the host controller can be located in close proximity to the monitored locale, such as a warehouse or like facility 10, or be disposed a fixed or variable remote distance therefrom in the case of transportation vehicle 12, 13, etc.

In addition to the host controller 14, the monitoring system of the present invention comprises a reader assembly which includes at least one, but dependent upon the specific preferred embodiment being utilized and the practical applications associated therewith, a plurality of readers. In the preferred embodiment of FIG. 1, the plurality of readers are generally indicated as 18 and are fixedly disposed in a predetermined array relative to the configuration of the locale 10 being monitored. More specifically, the plurality of readers 18 are disbursed throughout the monitored locale 10 so as to provide complete, real time communication with a plurality of tags 20 contained within the locale 10.

As shown the plurality of tags 20 are associated with a plurality of articles 22 which of course may be defined by any type of product, object, personnel identification badge, etc. The plurality of tags utilized in a specific user application may vary in structure, function and operation and, as will be described hereinafter, may be broadly classified as being operative in a passive mode (passive tags) or active mode (active tags). The passive and active tags are distinguishable from one another by the active tags including a self-contained power source such as a battery, which may or may not be rechargeable. The passive tags are absent any self contained power source. Further, both the active and passive tags are generically defined by micro-circuitry including a transmitter and/or transceiver as well as appropriate transmitting and/or receiving antennas. Customized integrated circuits (IC) could be adapted for specific customer or user applications as required and still being incorporated within the spirit and scope of the present invention.

The various categories of monitoring tags, being either passive or active, may also be structured to be at least uni-directional in terms of transmitting identification or other pertinent data therefrom to one or more readers defining a particular reader assembly. Alternatively, in at least one preferred embodiment of the monitoring system of the present invention, the tags include bi-directional communication capabilities wherein data may be transmitted from the tag to the one or more readers and acknowledgment and other directive or informative signals may be directed from the one or more readers back to the tag.

Yet another structural and operative feature of the tag assembly of the present invention is the ability of at least some of the aforementioned tags to include multi-frequency capabilities. More specifically, a first frequency is utilized to activate either a passive or active tag, dependent upon the specific embodiment being practiced. Tag activation can be broadly defined as providing power to passive tags and/or serving to "wake-up" active or passive tags. Also, the recharging of the batteries included in the structure of the active tags can also be accomplished by exposing the active tags to a generated field or signal at the first frequency.

In compliance with FCC regulations the first frequency, preferably in the bandwidth of 13.56 MHz, is allowed to be generated at an increased field or signal strength which is sufficiently high to enhance the operative range between the tag and the reader or other activation facility serving to generate the activating field or signal. In accordance with FCC regulations establishing a field strength of "unlimited radiated energy" in the bandwidth parameters specified for certain frequencies (13.56 MHz.) is permitted absent any potential hazards associated with human exposure. The activating or operative proximity range can thereby be extended to approximately 12 to 15 feet without violating FCC regulations.

In addition, the multi-frequency capabilities of certain ones of the plurality of tags may also be defined by data transmission or communication from the tag to the reader assembly at a second frequency which differs from the first frequency. The second frequency is preferably, but not exclusively, in the 9.15 MHz, 868 MHz or 433 MHz frequency range. Accordingly, data is transmitted between the plurality of tags at the designated second frequency on a repetitive pulsed basis rather than maintaining a continuous field or constant signal generation at the lower 13.56 MHz which preferably defines the first frequency.

Figure 2:
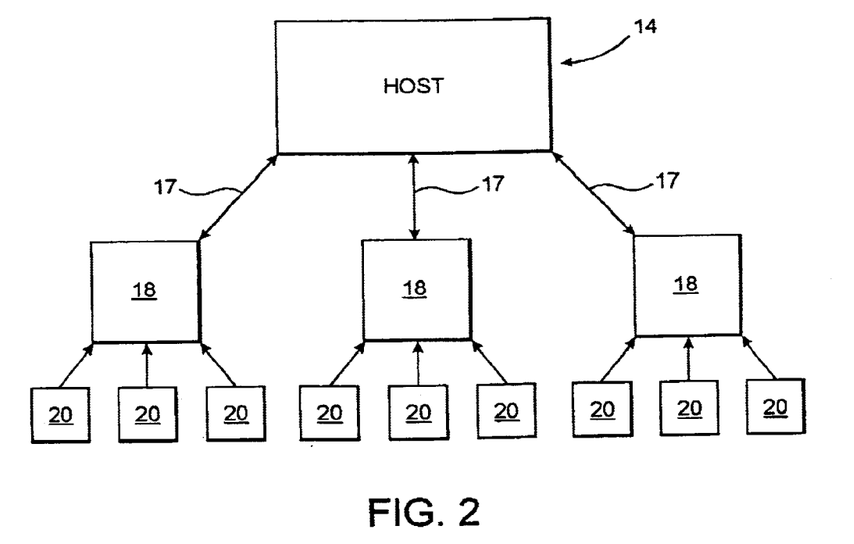
FIG. 2 is a schematic representation of the interaction between various operative components of at least one preferred embodiment of the system of the present invention, including a host controller, reader assembly and tag assembly.

It is to be understood that not all of the plurality of tags, either passive or active, are structured for intended exposure to the first frequency range in order to accomplish activation. More specifically, and with reference to the embodiments of FIGS. 1 and 2, the one or more readers 18 are disposed in a predetermined proximity relative to a plurality of tags 20 within the monitored locale 10. Each of the tags 20 are operative in an active mode and are structured for uni-directional transmission. As such, each of the tags 20 is normally maintained in "sleep mode" for certain pre-programmed periods of time. After the time period has expired, the tag will automatically go into its unique anti-collision skim and start transmitting appropriate identification or like data several times to make sure that one or more of the plurality of readers 18 will receive such transmitted data. After the data is transmitted several times, the tag will then automatically reset itself and will again go into a sleep mode until a predetermined or pre-programmed time has again expired. Transmission will then be repeated. Further, the plurality of tags can have the same transmission time or different pre-scheduled transmission times.

Figure 7:
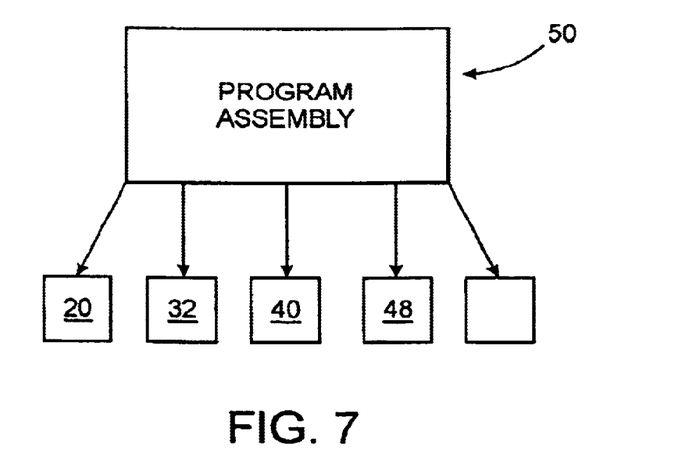
FIG. 7 is a schematic representation of a programming station or assembly for programming one or more tags included within the monitoring system of the present invention.
Figure 8:
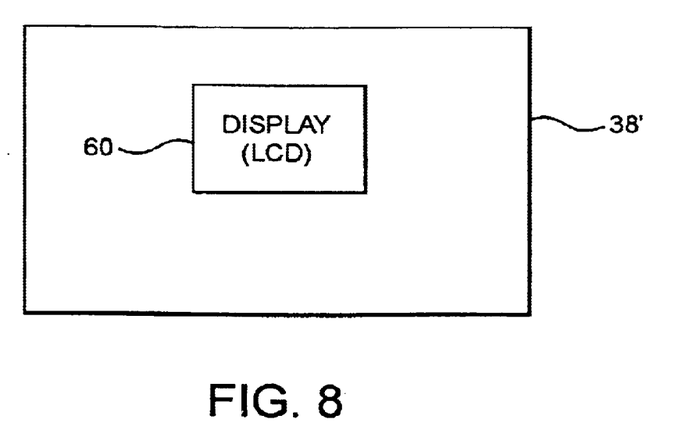
FIG. 8 is a schematic representation of another preferred embodiment of a reader associated with the reader assembly of the present invention.

Clearly, the time period that the tag goes to "sleep" varies based on customer requirements. However, additional structural and operative features associated with the RF tags, will cause the tags to start communication or transmission to the reader assembly asynchronously based on the occurrence of certain events. By way of example, asynchronous transmission of a tag may occur, in certain preferred embodiments of the present invention, when the tag wakes-up because it is passing through certain electronic field or because it receives a stand-by command by receiving pulses of a specified frequency from the reader. Alternatively, the tag will wake-up because it went into a programming mode as will be explained with reference to do the embodiment of FIG. 7. The tag may also wake-up because of the existence of a tampering detector or because of a low power detection of the self-contained power source associated with active tags. As also to be described in greater detail hereinafter, the tags may wake-up or operatively communicate with a hand held reader at a preferred 13.56 MHz frequency.

Two categories of active tags are distinguishable, at least in part, as being either directional or uni-directional in their intended transmission capabilities. The bi-directional active tag, after transmitting its tag identification or other appropriate data to the reader may expect to receive an acknowledgment or other directive signal from the host controller through the reader assembly. If the bi-directional active tag receives no response signal or an un-acceptable acknowledgment or directive signal it reverts back to its anti-collision skim and continuously sends transmitted data until it receives an acceptable acknowledgment signal from the host. The bi-directional active tag will then re-set its timer in the conventional fashion, as with the uni-directional active tag, and it will go into a sleep mode until the pre-programmed time expires. Upon expiration of the preprogrammed time transmission of the ID or other appropriate data will be repeated. As with the uni-directional active tag, the bi-directional active tag will start to communicate with the reader on an asynchronous basis upon the occurrence of specific events, as set forth above.

In order to better achieve real time inventory control and facilitate desired tracking procedures, concurrent communication of the plurality of tags with the reader assembly is accomplished through the inclusion of an anti-collision protocol. More specifically, a multi-tag algorithm is integrated into the tag assembly and/or reader assembly which is operative to allow the concurrent transmission by and reading of data from a plurality tags while encountering minimal if any meaningful interference. Accordingly, upon being activated each of the plurality of tags assumes an anti-collision skim prior to pre-scheduled and/or asynchronous communication.

The reader assembly of the present invention serves as a communication link between the plurality of tags and host controller 14. As such, the reader assembly may include one or more readers, dependent upon the specific practical application and the preferred embodiment associated therewith, wherein various types of readers may be defined as part of the reader assembly. Preferably, common structural and operational features are included in each of the various readers, regardless of their type or category. Further, each of the various types of readers have a dynamic addressing capability as it powers-up. In doing so, the individual reader will send a power-up command to inform the host controller 14 that it is alive and requesting a specific reader address. The host 14 will initiate the addressing of the reader and in performing this initialization process, a two way communication link is established there between as at 17 utilizing the second frequency range of the tags 20 or other appropriate frequency range. Further, the communication link 17 represents either a hard wire connection or wireless communication. It should also be noted that the reader address can be established automatically without having any addressing switches.

The reader assembly can include one or more fixed readers, such as readers 18 being fixedly disposed throughout the monitored locale 10. In this context, the term "fixed" is not necessarily meant to describe a permanent mounting in that the various readers 18 can be removed, repaired, replaced, etc. Further in the embodiment of FIGS. 1 and 2 the readers 18 may be powered by a conventional 110 or 220 power source and be connected thereto by being removably attached to a conventional light socket or by utilizing other means of attachment.

Figure 3:
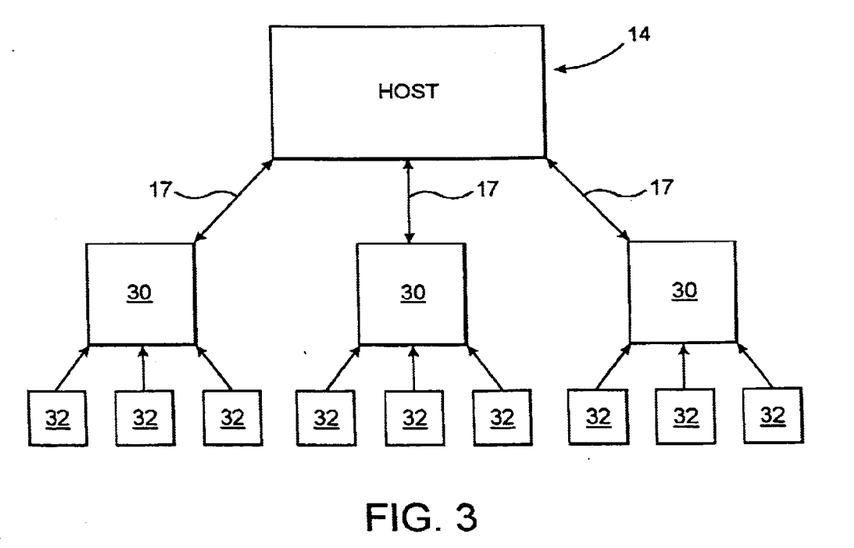
FIG. 3 is a schematic representation of the interaction between the various operative components of another preferred embodiment of the system of the present invention.

With reference to FIG. 3, another preferred embodiment of the present invention comprises the reader assembly including at least one but preferably a plurality of shelf readers 30. The shelf readers 30 are at least partially distinguishable from the warehouse or fixed readers 18 as set forth in greater detailed hereinafter. As such, each of the shelf readers 30 include a 915 MHz., 868 MHz or 433 MHz. transceiver that communicates with the tag. The tag assembly comprises a plurality of tags 32 associated with a plurality of articles being monitored (not shown for purposes of clarity), wherein the tags 32 are active and include multi-frequency, bi-directional capabilities. As such, the one or more readers 30 generates and transmits an activation signal at the aforementioned first frequency of 13.56 MHz. for purposes of tag activation or wake-up. Upon being activated, the tags 32 will send the appropriate data transmissions to the one or more shelf readers 30. The readers 30 will send the transmitted data received from the tags to the host controller 14 for further processing. Communication between the readers 30 and the host controller 14 will occur by either RS232, wireless communications at 2450 MHz., or the specific tag communication frequency, as set forth above.

The physical characteristics of the shelf readers 30 may of course vary but such readers 30 typically include 13.56 MHz. antennas mounted on or within an appropriate casing that can be attached to or otherwise associated with shelving or other facilities on which the various articles being monitored are stored, displayed, etc. It should be apparent, that the particular preferred embodiment incorporating the shelf readers 30 and the cooperatively structured bi-directional, multi-frequency capable tags 32 is readily adaptable for retail outlets or like retail facilities.

Figure 4:
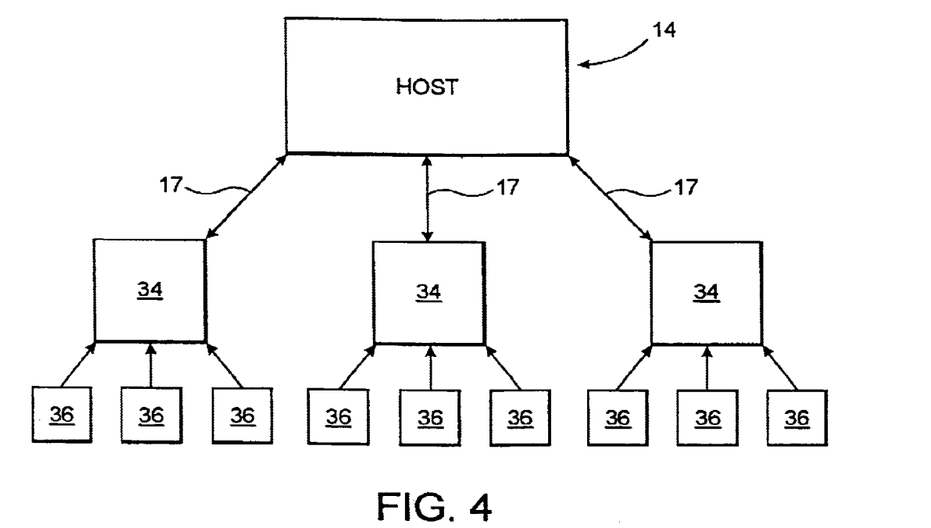
FIG. 4 is a schematic representation of the interaction between the various operative components of yet another preferred embodiment of the system of the present invention.

In another preferred embodiment schematically represented in FIG. 4, the monitored locale comprises a vehicle 12 and/or 13. As such, the reader assembly associated therewith comprises one or more vehicle readers 34 disposed in communicating relation with a plurality of tags 36 defining the attendant tag assembly. As with the previous preferred embodiments, the one or more vehicle readers 34 include a 915 MHz., 868 MHz. or 433 MHz transceiver which communicates with the plurality of tags 36. The tags are associated with a plurality of shipping boxes, containers or directly with the articles themselves. As the tags 36 are self activated from their sleep mode, ID or other appropriate data is transmitted to the one or more vehicle readers 34. The vehicle readers 34 are structured to have the capability of communicating this transmitted data from tags 36 to the host controller 14.

The one or more vehicle readers 36 can be powered by a variety of substantially conventional power sources such as one or more batteries or any other appropriate power source which may be associated with the vehicles 12, 13, etc. Moreover, when the monitored locale is a transport vehicle including a truck 13, A tracking procedure may be incorporated within this preferred embodiment of the subject monitoring system. More specifically, when any box, shipping container or article associated with one of the tags 36 passes into or out of the truck 13, the tags 36 will be automatically activated on an asynchronous basis and send tag ID or other appropriate data to the one or more readers 34. In addition, at least some of the tags which are communicative with the vehicle reader can include information relating to the vehicle and/or driver identification. Accordingly, as the vehicle approaches a given area, security or other personnel can check the tag identification information with vehicle documents, drivers license, etc. Appropriate information will be transmitted to the host controller 14 for processing. Therefore, the loading of the boxes, articles, etc. with the tags 36 mounted thereon will allow the inventory information to be coordinated with various shipping invoices or other documentation to determine the existence or nonexistence of a discrepancy therebetween. Communication between the readers 34 and host controller 14 can be accomplished by a variety of substantially conventional communication facilities.

Figure 5:
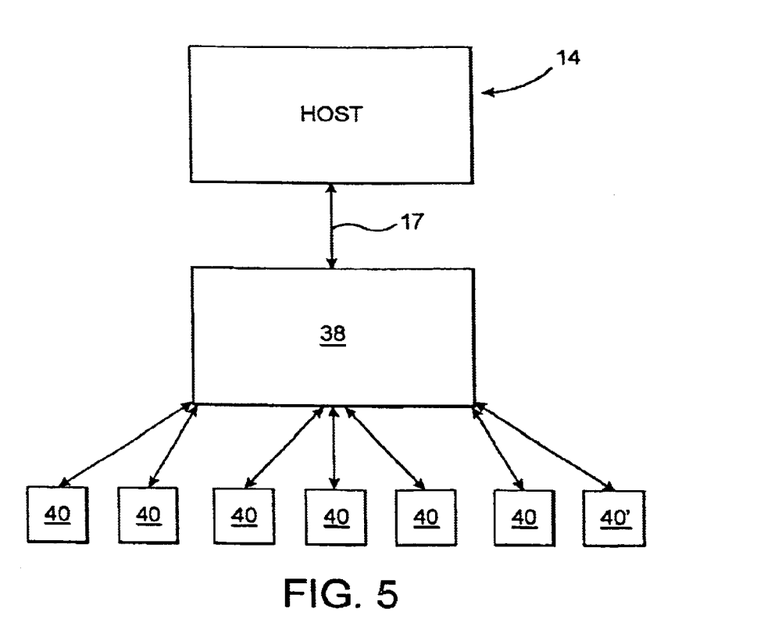
FIG. 5 is a schematic representation of the interaction between the various operative components of yet another preferred embodiment of the system of the present invention.

Still another preferred embodiment of the present invention is schematically represented in FIG. 5. As schematically represented therein, the reader assembly includes at least one or alternatively a plurality of mobile or handheld readers 38. The mobile readers 38 are communicative with the host controller 14 by an appropriate communication link 17 as described above. As will be apparent, the mobile or handheld reader 38 is particularly adaptable for inventory control in the application of a variety of different retail facilities. As with the previously described readers, the handheld/mobile reader 38 has a 915 MHz., 868 MHz., or 433 MHz. transceiver that communicates with the plurality of tags 40. The handheld/mobile reader 38 will transmit an activating signal at the aforementioned first frequency of preferably 13.56 MHz. By manual control of certain control facilities or hardware associated directly with the mobile reader 38. As a result, at least one, but preferably all of the plurality of tags will exposed to the generated field at the first frequency and will wake-up and transmit (at the second frequency) ID and/or other appropriate data to the handheld/mobile reader 38. Also, the mobile reader 38 has the ability to "write" appropriate information into a storage facility associated with the various tags for subsequent accessing.

Figure 9:
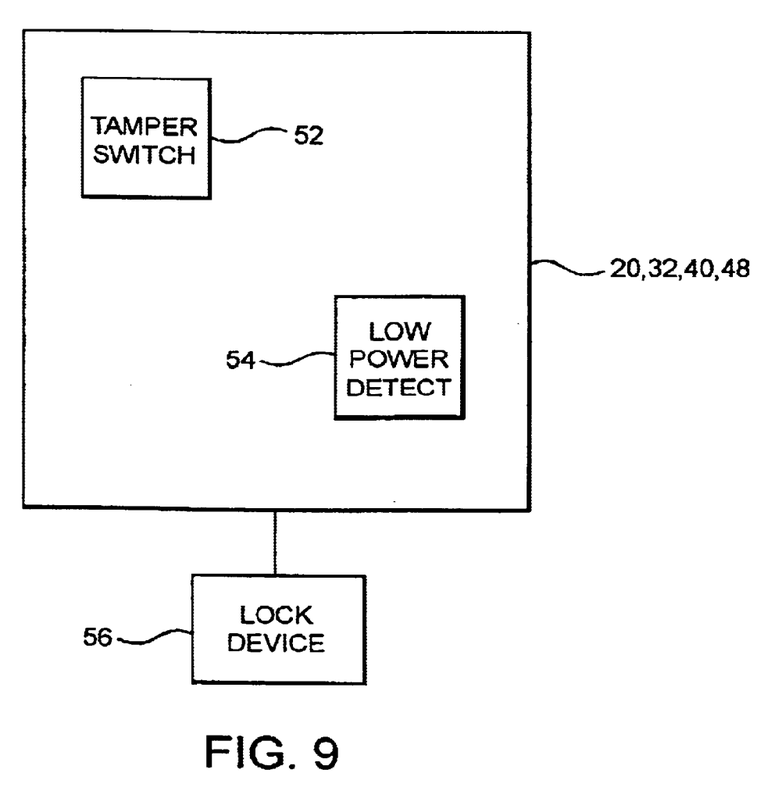
FIG. 9 is a schematic view showing details of various operative and structural variations of the tags utilized in one or more of the various preferred embodiments of the system of the present invention.

In certain instances associated with the intended inventory control procedure the identifying of a specific tag location, existence, identity, etc. may be required. In doing so, the reader 38 will determine the strength of the transmitted signal from a designated or searched for tag 40. As the handheld/mobile reader 38 enters into a closer proximity to a specified tag as at 40', the transmitted signal from tag 40' will of course increase until the reader 38 narrows the proximity range down to the specific tag 40'. The handheld reader 38 may also include specific visual display facilities which will be explained in greater detail with reference to FIG. 9 but which generally may be in the form of an LCD display.

Figure 6:
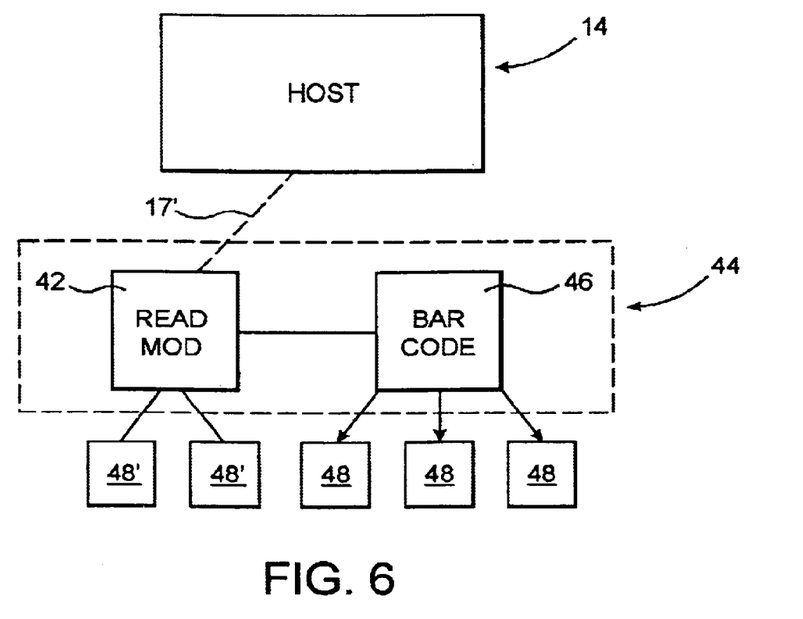
FIG. 6 is a schematic representation of the operative components of at least one preferred embodiment of a reader associated with the reader assembly of the present invention.

The versatility of the monitoring system of the present is invention is further evidenced by the schematically represented preferred embodiment of FIG. 6. In this embodiment a reader module 42 can be embedded in a bar code reader generally indicated as 44. A bar code scanner or other facility 46 is operative to scan or detect certain bar codes on tags and/or labels 48. The bar code data is communicated to the reader module 42 which serves to re-transmit the bar code data to the host controller 14 for further processing. The reader module 42 may also be operatively structured within the overall bar code reader 44 to independently read appropriately configured tags as at 48' independent of any bar code display thereon. As set forth above the communication link 17' between the reader module 42 and the host controller 14 is bi-directional and in this context host controller 14 may send an acknowledgment signal after receiving any appropriate data from the reader module 42.

At least one preferred embodiment of the monitoring system of the present invention includes the provision of programming assembly or station generally indicated as 50. Each of a plurality of tags, regardless of their intended performance and operative content and indicated in FIG. 7 as 20, 32, 40 and 48, are structured to be programmed and/or re-programmed by programming assembly 50. The programming assembly 50 will use the same frequency that powers the tag (first frequency) but preferably at a much lower field strength in order to comply with specific FCC regulations. Therefore, the proximity "write" range between the programming assembly 50 and the one or more tags 20, 32, 40, 48, etc. being reprogrammed will be significantly shorter than that available when normally utilizing the first frequency at high field strengths. Acknowledgment of re-programming will be observed through an appropriate acknowledgment signal generated by the plurality of tags at the normal communication frequency (second frequency). The programming assembly 50 and the various structures of the individual tags provide for the programming or reprogramming of the tags individually or collectively.

Further structural features preferably, but not necessarily, common to all of the plurality of tags 20, 32, 40, 48, etc. is the inclusion of a tamper switch or detector. As a result an attempt to remove the tag from the article being monitored or otherwise disassociate it therefrom will result in its automatic activation or wake-up. The generation of a warning or alarm signal from the tag to the host or an appropriate reader will result in the signaling of the host controller 14. Similarly, for the various active tags incorporating a self contained power source, a low battery detector 54 can also be incorporated in the various active tags so as to detect a failure or a predetermined low energy output from the self contained power source. Similar automatic activation and alarm signaling of the host, preferably through an appropriate reader will also be accomplished.

Yet another device associated with at least some of the plurality of tags is the inclusion of a mounting or lock device or assembly 56. Such lock device 56 will be particularly 13 adaptable for use in a retail facility or environment. As such, the tag 20, 32, 40, 48 etc. will be connected to a product displayed or presented for sale (and/or stored items). The lock device will prevent the tag from becoming detached from the article being monitored unless it is exposed to an electric field or signal, preferably within the first frequency range of 13.56 MHz. This field will cause activation or wake-up of the tag and the tag will send ID or other appropriate data to one or more readers of an associated reader assembly. If the transmitted data is valid, recognizing that the customer is buying the item, then the reader will send a command to the lock device 56 allowing the associated tag to be removed from the article being sold prior to it leaving the retail facility.

One or more of the preferred embodiments of the present invention may incorporate one or more readers 38' incorporating a display facility 60. A typical practical application of the leader 38' having a display facility 60 is that used in the mobile or handheld computer 38 in the preferred embodiment of FIG. 5. As such, the reader 38, 38' has a 2450 MHz. or 915 MHz., 868 MHz. or 433 MHz. transceiver that communicates with the host controller 14. The reader 38, 38' is connected directly to any size LCD or other appropriate display 60. The display 60 will be used for displaying any information about the monitored article, transporting carrier, box, contents or any other information that the customer/user would like to display in maintaining an inventory control and/or tracking procedure as set forth above.

Common to at least some of the preferred embodiments described above is the inclusion of certain "repeater capabilities" within one or more of the individual readers associated with any reader assembly. As such, a repeater/reader serves as an amplifier and, in addition to processing any transmitted data in the context of the normal reader performance characteristics, will facilitate transmission of such data between readers or from the readers to the host controller 14. Typically, a repeater/reader is positioned and/or utilized when a conventional reader without repeater capabilities is located a distance from the host controller or other readers which derogatorily affects the efficient or reliable transmission of communication signals therebetween.

In addition to the above the various readers, tags, etc. may be provided with various antenna structures operative to form their intended communication functions. Such various antenna structures may include a high frequency reader antenna, transmitter antenna, shelf antenna (short range), communication antenna, etc.

With further reference to FIG. 1, the monitoring system of the present invention, while characterized by efficiently demonstrating inventory control over a plurality of articles, also may incorporate specific tracking features which detect not only the existence, location, identity, etc. of the various tags and articles associated therewith, but also facilitates the monitoring of the movement of such tags and associated articles within a locale being monitored and/or as the plurality of tags and associated articles move into and out of the monitored locale. As such, one or more access portals 100 may exist within the monitored locale 10. A reader or transponder facility is mounted in association therewith and within a predetermined operative range of preferably at least 12 to 15 feet or greater. This facility communicates with the host controller 14. A field generator or like generating facility 102 may serve to generate an electric field of sufficiently high strength to define the detection range or operative proximity of tags passing towards, and into and out of the access portal 100. Other such "tracking facilities" may be located at various locations throughout the locale so as to provide a more precise control of the movement of the tags and associated articles throughout the locale 10 being monitored. Such a tracking facility and the operative procedures associated therewith may be incorporated within the inventory control system as described above or be utilized separately therefrom wherein various structural and operative modifications would be incorporated within the reader assembly and/or tag assembly as well as other operative components associated therewith.

Further, cameras, monitors, recorders and/or other video facilities may be located at one or more locations within a locale being monitored. Such facilities can be structured to operate in conjunction with and be at least partially controlled by the reader assembly and/or host controller so as to provide visual observation of personnel, objects, products, etc., as they are located or travel within or about a location being monitored.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A monitoring system for maintaining inventory control on a real time basis, said system comprising:
   a) at least one host controller,
   b) a plurality of tags associated with a plurality of articles located within a monitored locale,
   c) a reader assembly disposed in communicating relation with said plurality of tags,
   d) at least some of said plurality of tags capable of at least uni-directional transmission to said reader assembly, and
   e) said reader assembly communicative with both said host controller and said plurality of tags for real time determination of a status of individual ones of said plurality of tags and the articles associated therewith; and
   f) said reader assembly being structured to provide said host controller with a non-compliant communication upon failure to receive a transmission from one or more of said plurality of tags.

2. A monitoring system as recited in claim 1 wherein at least some of said tags are further structured for asynchronous transmission to said reader assembly.

3. A monitoring system as recited in claim 2 wherein said plurality of tags include tags structured to operate in an active mode.

4. A monitoring system as recited in claim 3 wherein said active mode is at least partially defined by operation utilizing a self contained power source.

5. A monitoring system as recited in claim 2 wherein said plurality of tags comprise one or more passive tags and one or more active tags operatively distinguishable from one another by said one or more active tags having a self contained power source.

6. A monitoring system as recited in claim 2 wherein said plurality of tags comprise one or more active tags or one or more passive tags, said passive tags and active tags being operatively distinguishable from one another by said active tags having a self-contained power source.

7. A monitoring system as recited in claim 1 wherein at least some of said plurality of tags are structured for activation upon exposure to a signal at a first frequency and further structured for transmission to said reader assembly at a second frequency.

8. A monitoring system as recited in claim 7 wherein said first and second frequencies are different and collectively define a multi-frequency capability of at least some of said plurality of tags.

9. A monitoring system as recited in claim 8 wherein said transmission to said reader assembly at said second frequency occurs on a periodic pulse basis.

10. A monitoring system as recited in claim 9 wherein said second frequency is approximately 915 MHz.

11. A monitoring system as recited in claim 8 wherein said plurality of tags are exposed to said first frequency at a substantially continuous, high field strength.

12. A monitoring system as recited in claim 11 wherein said first frequency is approximately 13.56 MHz.

13. A monitoring system as recited in claim 1 wherein said host controller generates an alarm indicative of said one or more tags failure to transmit to said reader assembly.

14. A monitoring system as recited in claim 1 further comprising a multi-tag anti-collision protocol comprising said plurality of tags and said reader assembly cooperatively structured to allow concurrent reading of multiple transmissions from said plurality of tags.

15. A monitoring system as recited in claim 1 wherein said reader assembly comprises a plurality of fixed readers disposed within the monitored locale in predetermined relation to one another, each of said readers comprising a transceiver structured to receive transmissions from at least some of said plurality of tags and transfer received transmission data from said tags to said host controller.

16. A monitoring system as recited in claim 1 wherein the monitored locale is a vehicle; said reader assembly comprising at least one vehicle reader including a transceiver structured to receive transmitted data from a number of said plurality of tags associated with the vehicle and communicate the transmitted data to said host controller at a location remote from the vehicle.

17. A monitoring system as recited in claim 1 wherein at least some of said plurality of tags include bi-directional, multi-frequency capabilities at least partially defined by activation of said tag at a first frequency and transmission thereby at a second frequency, said first and second frequencies being different and being generated at different field strengths.

18. A monitoring system as recited in claim 17 wherein said reader assembly comprises at least one shelf reader disposed within the monitored locale in predetermined proximity to said plurality of tags.

19. A monitoring system as recited in claim 18 wherein said at least one shelf reader comprises a transceiver structured to generate an activation signal at said first frequency to said plurality of tags and receive transmitted data from said plurality of tags at said second frequency subsequent to activation of said plurality of tags.

20. A monitoring system as recited in claim 17 wherein said reader assembly comprises at least one mobile reader movably disposed within the monitored locale and structured for wireless communication with said plurality of tags and said host controller.

21. A monitoring system as recited in claim 20 wherein said one mobile reader includes a transceiver.

22. A monitoring system as recited in claim 21 wherein said one mobile reader includes tag identification capabilities comprising the locating of individual ones of said plurality of tags based on field strength of transmitted signals from said plurality of tags.

23. A monitoring system as recited in claim 20 wherein said one mobile reader further comprises display facilities structured for visual display of received transmitted data.

24. A monitoring system as recited in claim 20 wherein said one mobile reader further comprises bar code reading capabilities, said reader structured to transmit bar code data to said host controller.

25. A monitoring system as recited in claim 24 wherein said host controller comprises bi-directional communicating facilities structured to receive said bar code data from said reader assembly and transmit an acknowledgment thereof to said mobile reader.

26. A monitoring system as recited in claim 1 wherein said plurality of tags are programmable and structured to selectively change at least identification and address data relating thereto.

27. A monitoring system for monitoring inventory control on a real time basis, said system comprising:
 a) at least one host controller,
 b) a tag assembly comprising a plurality of tags associated with a plurality of articles located within a monitored local,
 c) a reader assembly including at least one reader disposed in communicating relation with said plurality of tags,
 d) at least some of said plurality of tags structured for at least uni-directional transmission to said reader assembly on a pre-scheduled time basis,
 e) said one reader communicative with both said host controller and said plurality of tags for real time determination of a status of individual ones of said plurality of tags and the articles associated therewith; and
 f) said reader assembly being structured to provide said host controller with a non-compliant communication upon failure to receive a transmission from one or more of said plurality of tags.

28. A monitoring system as recited in claim 27 wherein said plurality of tags comprise one or more passive tags and one or more active tags operatively distinguishable from one another by said one or more active tags having a self contained power source.

29. A monitoring system as recited in claim 27 wherein at least some of said plurality of tags include bi-directional, multi-frequency capabilities at least partially defined by activation of said tags at a first frequency and transmission of data from said tags to said reader assembly at a second frequency, said first and second frequencies being different.

30. A monitoring system as recited in claim 29 wherein said reader assembly comprises at least one shelf reader disposed within the monitored locale in predetermined proximity to said plurality of tags.

31. A monitoring system as recited in claim 30 wherein said at least one shelf reader comprises a transceiver structured to generate an activation signal at said first frequency to said plurality of tags and receive transmitted data from said plurality of tags at said second frequency, subsequent to activation of said plurality of tags.

32. A monitoring system as recited in claim 27 wherein said one reader comprises at least one mobile reader movably disposed within the monitored locale and structured for wireless communication with said plurality of tags and said host controller.

33. A monitoring system as recited in claim 32 wherein said mobile reader includes a transceiver structured to generate an activation signal at said first frequency to said plurality of tags and receive transmitted data from said plurality of tags at a second frequency, subsequent to said activation of said plurality of tags.

34. A monitoring system as recited in claim 27 wherein said reader assembly comprises a plurality of fixed readers disposed within the monitored locale in predetermined relation to one another, each of said readers comprising a transceiver structured to receive transmissions from at least some of said plurality of tags and transfer received transmission data from said tag to said host controller.

35. A monitoring system as recited in claim 34 wherein at least some of said fixed readers are powered by conventional power sources and structured to be removably connected to a light socket, so as to receive power therefrom.

36. A monitoring system for maintaining inventory control on a real time basis, said system comprising:
 a) at least one host controller,
 b) a plurality of tags associated with a plurality of articles located within a monitored locale,
 c) a reader assembly disposed in communicating relation with said plurality of tags,
 d) at least some of said plurality of tags capable of at least uni-directional transmission to said reader assembly, and
 e) said reader assembly communicative with both said host controller and said plurality of tags for real time determination of a status of individual ones of said plurality of tags and the articles associated therewith; and
 f) said reader assembly including a power-up procedure comprising an initiating signal sent to said host controller, said initiating signal being indicative of an active status of said reader assembly.

37. A monitoring system as recited in claim 9 wherein said second frequency is approximately 856 MHz.

38. A monitoring system as recited in claim 9 wherein said first frequency is approximately 433 MHz.

39. A monitoring system as recited in claim 36 wherein said host controller is responsive to said initiating signal for an automatic establishment of a reader address.

\* \* \* \* \*